(12) United States Patent
Schmidt et al.

(10) Patent No.: US 6,474,432 B1
(45) Date of Patent: Nov. 5, 2002

(54) ADJUSTABLE FRONT AXLE AND BRAKE CARRIER STRUCTURE

(75) Inventors: Matt Schmidt, Marysville, OH (US); Tony Schroeder, Huntington Beach, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/939,821

(22) Filed: Aug. 27, 2001

Related U.S. Application Data
(60) Provisional application No. 60/303,112, filed on Jul. 5, 2001.

(51) Int. Cl.$^7$ .......................... B62D 61/12; B60B 37/00
(52) U.S. Cl. ....................... 180/209; 180/906; 280/279; 301/1
(58) Field of Search ......................... 280/279; 180/209, 180/218, 906; 301/1, 110.5, 6.1, 6.8

(56) References Cited

U.S. PATENT DOCUMENTS

| | | | |
|---|---|---|---|
| 4,588,232 A | 5/1986 | Kim et al. | |
| 4,602,822 A | 7/1986 | Kim et al. | |
| 4,638,881 A | * 1/1987 | Morioka et al. | ............ 280/279 |
| 4,755,005 A | 7/1988 | Tsai | |
| 4,756,547 A | 7/1988 | Trema | |
| 4,834,412 A | 5/1989 | Trema | |
| 4,875,543 A | 10/1989 | Verkuylen | |
| 4,993,734 A | 2/1991 | Trema | |
| 5,002,295 A | 3/1991 | Lin | |
| 5,240,087 A | 8/1993 | Parker | |
| 5,363,633 A | 11/1994 | Masaru | |
| 5,417,305 A | 5/1995 | Parker | |
| 6,186,918 B1 | 2/2001 | Yoo | |
| 6,371,571 B1 | * 4/2002 | Tsan | .............................. 301/1 |

FOREIGN PATENT DOCUMENTS

IT    MI2001A00770    4/2001

* cited by examiner

Primary Examiner—Daniel G. DePumpo
Assistant Examiner—Matthew Luby
(74) Attorney, Agent, or Firm—Rankin, Hill, Porter & Clark LLP

(57) ABSTRACT

A mounting assembly for adjustably securing an axle and a brake carrier to a front monofork of a motorcycle. The axle is received within an eccentric axle carrier and extends through a lower end of the brake carrier. An opposite end of the brake carrier includes an opening through which a carrier mounting device extends. The carrier mounting device is secured to the monofork and guides or aligns the brake carrier relative to the monofork. When the axle carrier is rotated to adjust the attitude of the motorcycle front end, the mounting device moves relative to the brake carrier while the brake carrier is maintained in a relatively fixed relationship to the wheel.

10 Claims, 4 Drawing Sheets

ADJUSTABLE FRONT AXLE AND BRAKE CARRIER STRUCTURE

BACKGROUND OF THE INVENTION

1. Field of the Invention

The present invention generally relates to motorcycles having a single front fork and, more particularly, to front axle and brake carrier adjustment mechanisms for such monofork motorcycles.

2. Description of Related Art

Motorcycles conventionally have a pair of front forks that support opposite ends of a front wheel axle. In addition to carrying the front wheel assembly, the front forks also cooperate to support the front brake assembly relative to the wheel. It is often desirable to be able to adjust the front end of the motorcycle, specifically the height of the front end, as this adjustment changes the responsiveness and steering characteristics of the motorcycle. With conventional motorcycles, this adjustment is accomplished by moving the fork structure with respect to the motorcycle frame, and does not affect the axle or brake assembly.

With motorcycles having only one front fork, referred to hereinafter as monoforks and/or monofork motorcycles, adjustment of the front end of the motorcycle cannot be accomplished in the same manner as in conventional motorcycles. While it is possible to make the length of the monofork adjustable, such an adjustment is problematic due to the inherently required stiffness of the fork.

Therefore, there exists a need in the art for a method and device for adjusting an attitude of a monofork motorcycle front end. There also exists a need in the art for an adjustable axle and brake carrier mounting arrangement for a monofork motorcycle.

SUMMARY OF THE INVENTION

The present invention is directed toward a monofork motorcycle attitude adjustment device and toward an adjustable axle and brake carrier arrangement for a monofork motorcycle.

In accordance with the present invention, an adjustable front axle and brake carrier structure for a monofork motorcycle includes a fork, an axle carrier housing, an axle carrier, a brake carrier, and a carrier mounting pin. The axle carrier housing is provided by a distal end of the fork. The axle carrier is received within the axle carrier housing and defines an eccentricallyaxle disposed axle opening through which an axle extends. The axle is secured to the wheel by an axle securing structure.

In further accordance with the present invention, the brake carrier has a first end and a second end. The brake carrier first end defines an opening through which the axle extends. The carrier second end defines an opening that is operably aligned and secured with the monofork.

In further accordance with the present invention, the carrier mounting pin is secured to the fork and is slidably received by the brake carrier. Rotation of the axle carrier causes the fork to move vertically and horizontally relative to the carrier while the wheel and the carrier remain stationary relative to one another. Accordingly, the attitude of the motorcycle front end may be easily adjusted. As used herein, the motorcycle attitude is meant to describe the relative length of the monofork in combination with the wheelbase or relative spacing between the front and rear wheels, and is altered to change the steering characteristics and responsiveness of the motorcycle.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
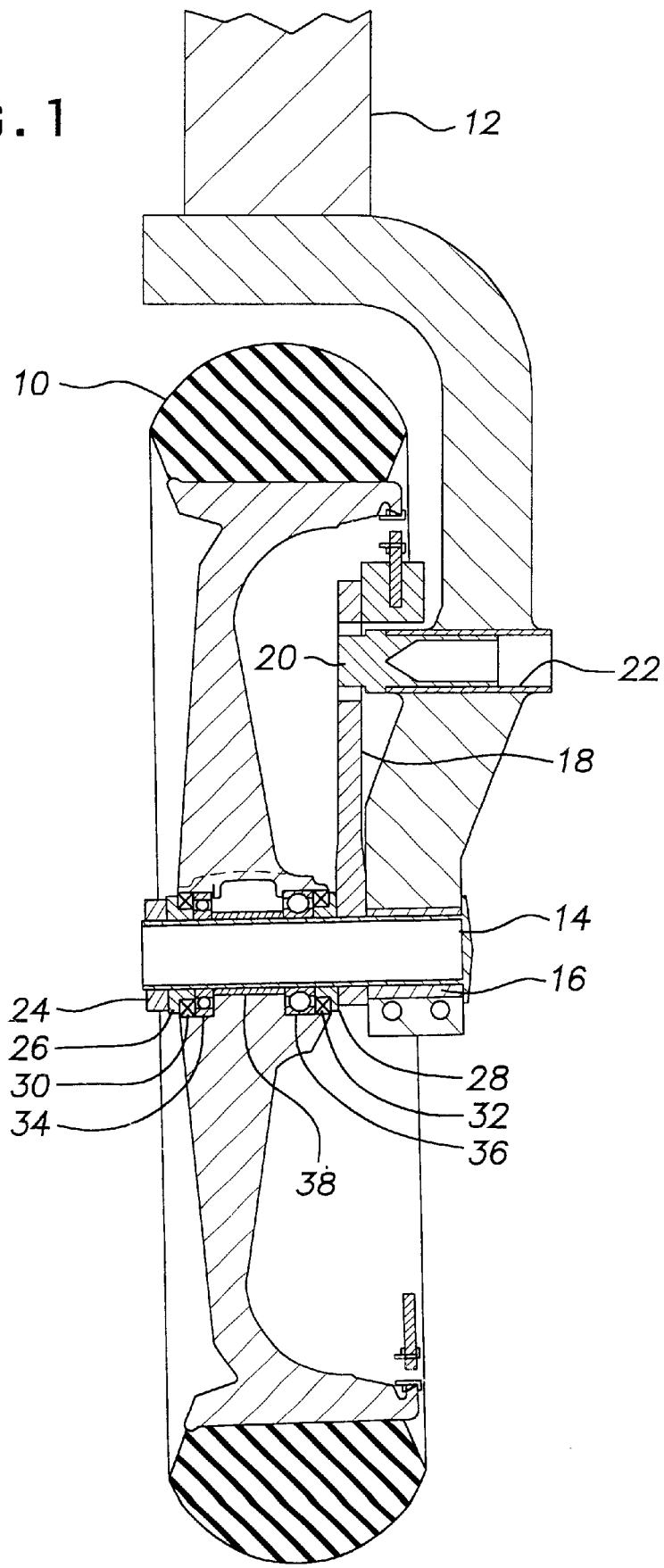
FIG. 1 is a cross-sectional view of an adjustable front axle and brake carrier structure according to a first embodiment of the present invention.

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
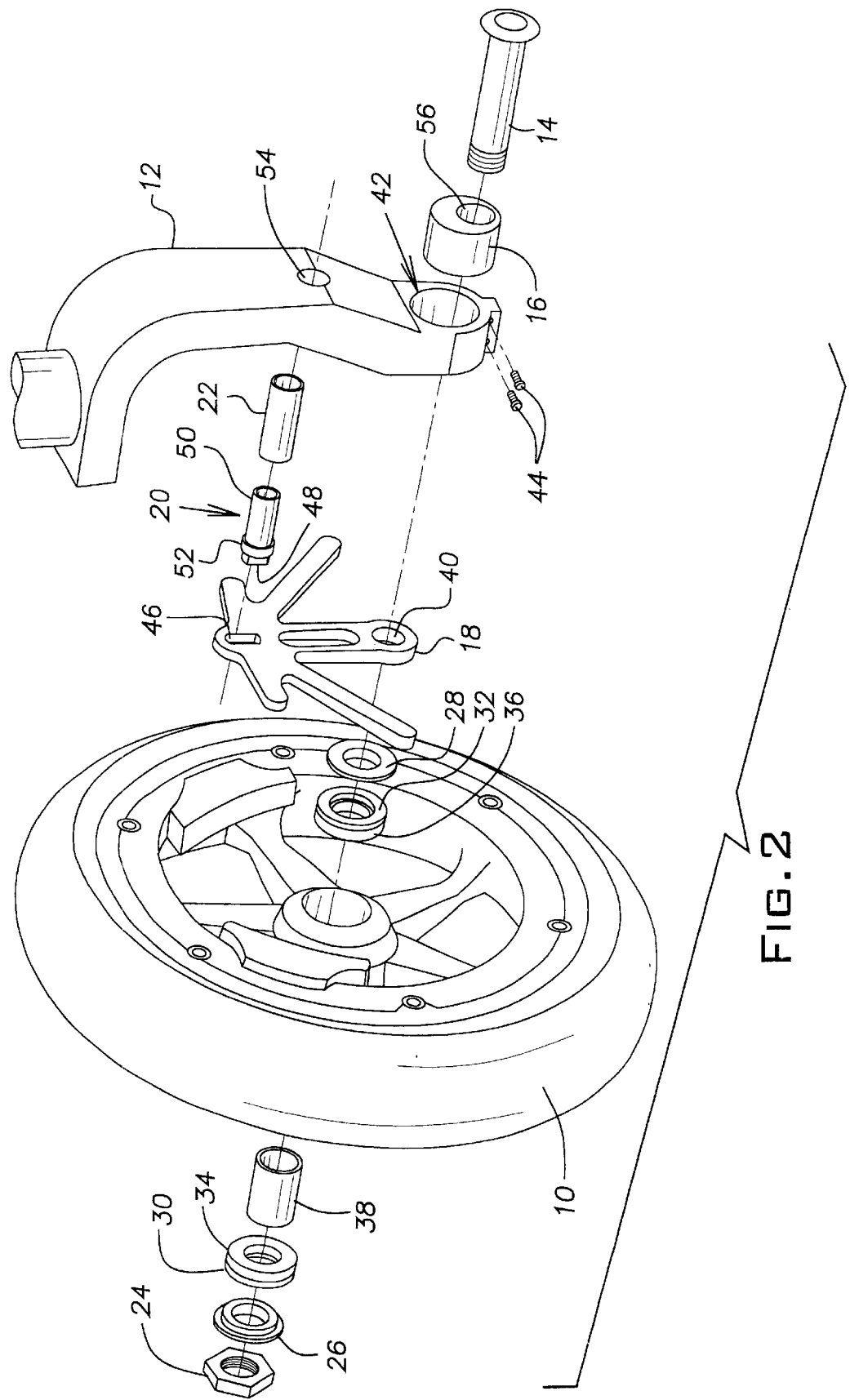
FIG. 2 is an exploded perspective view of the first embodiment shown in FIG. 1.

With reference to FIGS. 1 and 2, an adjustable front axle and brake carrier structure according to the first embodiment of the present invention is illustrated. The inventive structural assembly is used to adjustably secure the front wheel 10 and associated front brake calipers to the front monofork 12 of a motorcycle. The assembly includes an axle 14, an axle carrier 16, a brake caliper carrier or holder 18, a carrier mounting pin 20 and sleeve 22, and an axle securing assembly.

The axle securing assembly includes a nut 24, a pair of collars 26, 28, a pair of dust seals 30, 32, bearings 34, 36, and a spacer 38. Essentially, the bearings 34, 36 are placed on opposite sides of the spacer 38, with the spacer 38 extending through the wheel hub and keeping the bearings 34, 36 at a preset spacing. The dust seals 30, 32 are arranged outboard of the bearings 34, 36, and are compressibly held in place by means of the associated collars 26, 28.

On the side of the wheel 10 opposite the monofork 12, the nut 24 is threaded onto the distal end of the axle 14 and compressibly holds the axle securing assembly together within the wheel hub. On the other side of the wheel 10, the lower end of the brake caliper carrier 18 is disposed between the wheel 10 and the monofork 12, and has a hole 40 formed therein through which the axle 14 extends.

The axle carrier 16 is received in an axle carrier housing 42 provided by the lower end of the monofork 12. More specifically, the distal or lower end of the monofork 12 is a split axle carrier housing 42 that, upon loosening of its fasteners 44, may be spread apart to permit insertion of the axle carrier 16 and, by tightening the fasteners 44, may be clamped together to receive and frictionally retain the axle carrier 16 in a desirable fixed position. Although not preferred, the axle carrier housing 42 may include reduced-diameter ends to axially capture the axle carrier therebetween.

The upper end of the brake carrier 18 includes an elongated slot 46 through which extends a projecting tab 48 from the carrier mounting pin 20. The carrier mounting pin 20 has an elongated body 50 that is slidably and rotatably received in the sleeve 22. Between the elongated body 50 and the projecting tab 48, an enlarged annular rim or stop 52 is provided to limit insertion of the carrier pin 20 into the sleeve 22. The sleeve 22 is disposed in an accommodating hole 54 formed in the monofork 12, as illustrated.

As will be appreciated, the projecting tab 48 is smaller than the carrier elongated slot 46 so as to be loosely received in the elongated slot 46. This type of mounting permits the carrier mounting pin 20 to slidably move relative to the brake carrier 18 and rotatably move relative to the monofork 12 during adjustment of the front axle/wheel, to be described hereinafter.

The axle carrier 16 has an axle opening 56 that is offset relative to an axis of the axle carrier 16, as illustrated best in FIG. 2. The axle carrier 16 may be rotated to any desired position to adjust the relative vertical and horizontal (fore/aft) position of the axle 14 and, thus, the effective length of the monofork 12. For example, when the axle carrier 16 is in a position such that the axle opening 56 therethrough is at the lowermost position (i.e., the bottom center or six o'clock position, shown in FIG. 2), the effective length of the monofork 12 will be at a maximum, and the motorcycle front end will be higher. Alternatively, when the axle carrier 16 is in a position such that the axle opening 56 is at the uppermost position (i.e., the top center or twelve o'clock position, shown in FIG. 1), the effective length of the monofork 12 will be at a minimum, and the motorcycle front end will be lower. It is noted that the horizontal or fore/aft position of the axle 14 is the same in either the bottom center position or the top center position.

However, movement of the axle 14 to the nine o'clock position will place the axle in the maximum rearward position, thereby shortening the wheelbase, while movement of the axle 14 to the three o'clock position will place the axle in the maximum forward position, thereby lengthening the wheelbase. In this regard it is noted that the vertical position at three o'clock is the same as at nine o'clock. As such, a range of adjustment is provided between the aforementioned minimums and maximums by rotating the axle carrier 16 to alter the vertical/horizontal position of the axle opening 56. Rotation of the axle carrier 16 will cause the monofork 12 to move up/down and relatively forward/backward, while the wheel 10 and brake carrier 18 remain relatively still, it being noted that the slotted connection between the brake carrier 18 and the carrier mounting pin 20, and the rotary receipt of the pin 20 in the sleeve 22, facilitates the full range of vertical/horizontal adjustment afforded by the present invention.

With the present invention, adjustment of the attitude of the front end of the motorcycle is rather simple. The fasteners 44 clamping the axle carrier housing closed are loosened to free the axle carrier 16 for rotation. The axle carrier 16 is then rotated to a desired position by lifting or lowering the fork 12 relative to the wheel 10, and then the axle carrier housing fasteners 44 are re-tightened to secure the axle carrier 16 in the desired position. The carrier brake 18 is fixed on the wheel 10 and, thus, the carrier mounting pin 20 slides vertically and rotates within the elongated slot 46 provided in the carrier upper end. As such, the brake carrier 18 is maintained in a stable position relative to the wheel 10, while permitting the monofork 12, to which it is secured, a full range of movement.

Figure 3:
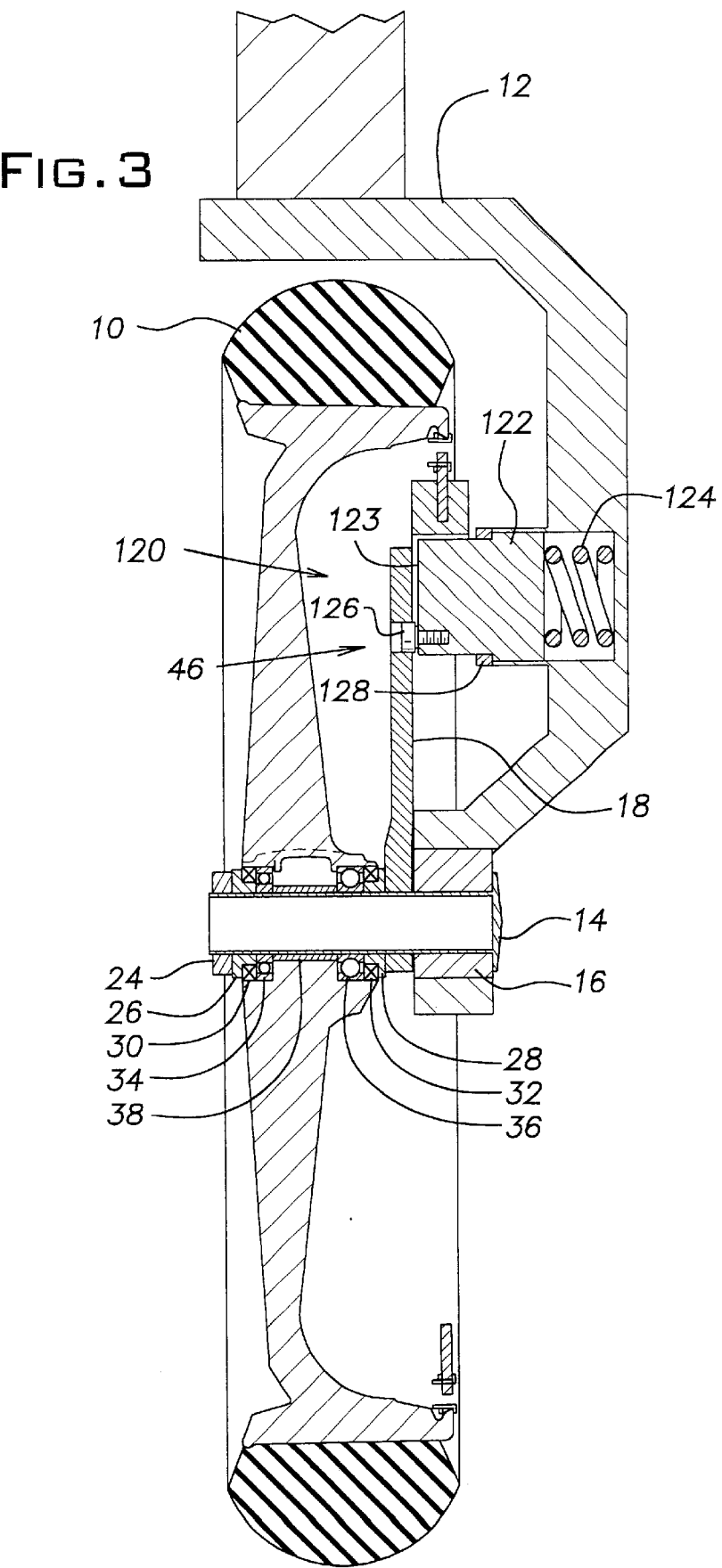
FIG. 3 is a cross-sectional view of an adjustable front axle and brake carrier structure according to a second embodiment of the present invention.
Figure 4:
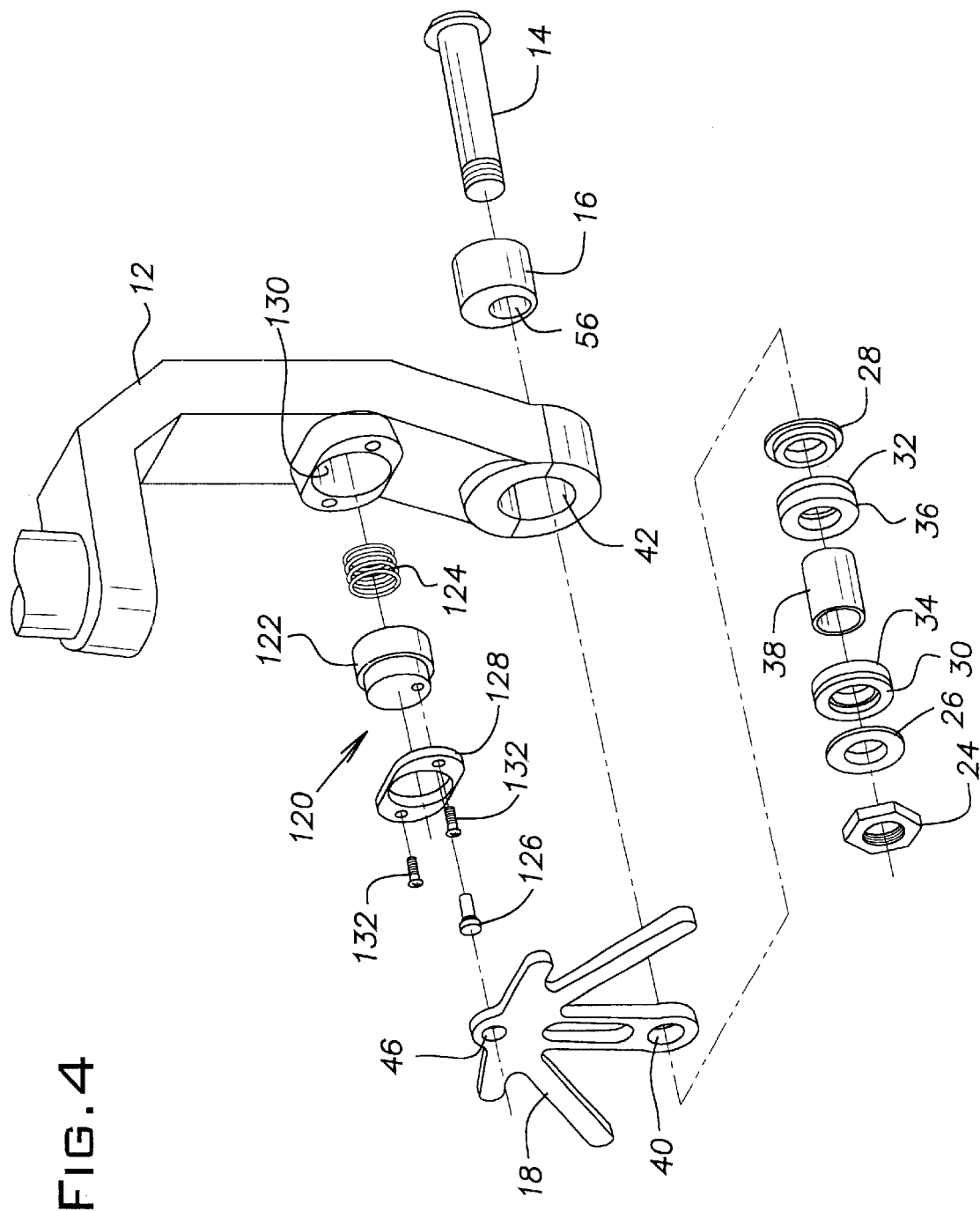
FIG. 4 is an exploded perspective view of the second embodiment shown in FIG. 3.

With reference to FIGS. 3 and 4, an adjustable front axle and brake carrier structure according to the second embodiment of the present invention is illustrated. The assembly includes the axle 14, axle carrier 16, brake caliper carrier or holder 18, a carrier mounting assembly 120, and the axle securing assembly. The axle securing assembly is substantially identical to that of the first embodiment described hereinbefore, and will not be described further hereinafter.

The carrier mounting assembly 120 includes a stub shaft 122, a coil spring 124, a set screw 126, and a cover 128. The shaft 122 and coil spring 124 are received in an accommodating recess or blind bore 130 in the monofork 12 and are held therein by the cover 128, which is secured to the monofork by means of fasteners 132. The shaft 122 includes a smaller diameter portion 123 that extends through an accommodating opening in the cover 128. A face of the smaller diameter portion 123 has a hole that receives the set screw 126. The head of the screw 126 is received in the hole 46 formed in the brake carrier 18. The shaft hole and, accordingly, the set screw 126, is offset relative to an axis of the shaft 122. Preferably, the diameter of the shaft 122 is generally equal to a diameter of the axle carrier 16 such that the shaft 122 and axle carrier 16 rotate in common. As will be appreciated, the set screw 126 will be essentially parallel to the axle 14 and, during adjustment of the axle 14 via rotation of the axle carrier 16, the set screw movement will track the axle movement. More specifically, an axis of the set screw 126 will preferably be offset from the shaft axis a distance equal to the distance that the axle axis is offset from the axle carrier axis.

Adjustment of the attitude of the front end of the motorcycle using the structure of the second embodiment of the present invention is similar to that described hereinbefore with reference to the first embodiment. The axle carrier housing 42 is released to free the axle carrier 16 for rotation. The fork 12 is lifted or lowered relative to the wheel 10 to the desired position, thereby rotating the axle carrier 16 and shaft 122. The axle carrier housing fasteners are retightened to secure the axle carrier 16 and shaft 122 in the desired position.

The present invention has been described herein with particularity, but it is noted that the scope of the invention is not limited thereto. Rather, the present invention is considered to be possible of numerous modifications, alterations, and combinations of parts and, therefore, is only defined by the claims appended hereto. For example, it is noted that the axle carrier may be mounted within the monofork by means other than the split axle carrier housing described herein.

What is claimed is:

1. An adjustable front axle and brake carrier structure for a monofork motorcycle, comprising:

a fork defining an axle carrier housing that receives an axle carrier, said axle carrier defining an axle opening through which an axle extends, said axle being secured to a wheel by an axle securing structure;

a brake carrier having a first end and a second end, said brake carrier first end defining a first opening through which said axle extends and said brake carrier second end defining a second opening; and, a mounting pin secured to said fork and received by said brake carrier second opening such that rotation of said axle carrier causes said fork to move relative to said brake carrier while said wheel and said brake carrier remain stationary relative to one another.

2. The adjustable structure according to claim 1, wherein said axle opening is offset relative to an axis of said axle carrier.

3. The adjustable structure according to claim 2, wherein said carrier pin is rotatably received in said fork.

4. The adjustable structure according to claim 3, wherein rotation of said axle carrier causes said fork to move in at least one of vertical and horizontal directions.

5. The structure according to claim 4, wherein said carrier mounting pin includes an end that projects through said brake carrier second opening, said pin being freely movable in said brake carrier to permit adjustment of said monofork relative to said wheel.

6. The adjustable structure according to claim 5, wherein said second opening is a slot in which said projecting end slides vertically.

7. The adjustable structure according to claim 6, wherein said axle carrier housing is adapted to be released to permit rotary adjustment of said axle carrier to a desired position and to be clamped to secure said axle carrier in the desired position.

8. A method for adjusting a motorcycle front monofork relative to a front wheel, said monofork having a lower end defining an axle carrier housing, said axle carrier housing being adapted to releasably receive an axle carrier through which an axle extends, a brake carrier being secured over said axle and being secured to said monofork, the method comprising the steps of:

releasing the axle carrier housing so that said axle carrier may be moved relative to said axle carrier housing;

moving said monofork relative to said wheel to a desired position, thereby causing said axle carrier to rotate;

re-securing the axle carrier housing so as to prevent rotation of said axle carrier relative to said axle carrier housing.

9. The method according to claim 8, wherein said axle carrier includes an axle opening that is offset relative to an axis of said axle carrier and wherein releasing said axle carrier housing permits rotation of said axle carrier to thereby move the monofork at least in one of vertical and horizontal directions.

10. The method according to claim 9, wherein, during said moving step, the monofork moves relative to said brake carrier and said brake carrier remains generally stationary relative to said wheel.

\* \* \* \* \*